(12) United States Patent
Kim et al.

(10) Patent No.: US 12,134,671 B2
(45) Date of Patent: Nov. 5, 2024

(54) ALKYL ACRYLATE COMPOUND-VINYL CYANIDE COMPOUND-AROMATIC VINYL COMPOUND GRAFT COPOLYMER, METHOD OF PREPARING THE SAME, AND THERMOPLASTIC RESIN COMPOSITION INCLUDING THE SAME

(71) Applicant: LG CHEM, LTD., Seoul (KR)

(72) Inventors: Seyong Kim, Daejeon (KR); Yong Yeon Hwang, Daejeon (KR); Bong Keun Ahn, Daejeon (KR); Min Jung Kim, Daejeon (KR); Jang Won Park, Daejeon (KR); Ji Yoon Jeon, Daejeon (KR); Eun Ji Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 551 days.

(21) Appl. No.: 17/434,691

(22) PCT Filed: Nov. 3, 2020

(86) PCT No.: PCT/KR2020/015182
§ 371 (c)(1),
(2) Date: Aug. 27, 2021

(87) PCT Pub. No.: WO2021/118063
PCT Pub. Date: Jun. 17, 2021

(65) Prior Publication Data
US 2022/0041783 A1 Feb. 10, 2022

(30) Foreign Application Priority Data
Dec. 10, 2019 (KR) .................. 10-2019-0163480

(51) Int. Cl.
| C08F 265/04 | (2006.01) |
| C08F 257/02 | (2006.01) |
| C08F 265/06 | (2006.01) |
| C08F 265/08 | (2006.01) |
| C08J 3/12 | (2006.01) |
| C08J 3/24 | (2006.01) |
| C08L 51/00 | (2006.01) |

(52) U.S. Cl.
CPC .......... C08F 265/04 (2013.01); C08F 257/02 (2013.01); C08F 265/06 (2013.01); C08F 265/08 (2013.01); C08J 3/126 (2013.01); C08J 3/245 (2013.01); C08L 51/003 (2013.01); C08F 2810/20 (2013.01); C08J 2351/06 (2013.01); C08L 2205/025 (2013.01); C08L 2205/03 (2013.01); C08L 2207/53 (2013.01)

(58) Field of Classification Search
CPC .... C08F 265/04; C08F 212/08; C08F 212/10; C08F 265/06; C08F 265/08; C08F 257/02
See application file for complete search history.

(56) References Cited

U.S. PATENT DOCUMENTS

| 3,944,631 | A | 3/1976 | Yu et al. |
| 10,487,204 | B2 | 11/2019 | Ahn et al. |
| 2006/0148992 | A1 | 7/2006 | Kim et al. |
| 2008/0245270 | A1* | 10/2008 | Klei .................. C08L 53/02 |
| | | | 106/287.23 |
| 2018/0312693 | A1* | 11/2018 | Iwanaga ............. C08L 33/12 |
| 2020/0181307 | A1* | 6/2020 | Iwanaga ............. C08F 2/24 |

FOREIGN PATENT DOCUMENTS

| CN | 1743371 A | 3/2006 |
| CN | 101139444 A | 3/2008 |
| CN | 103764700 A | 4/2014 |
| CN | 107531912 A | 1/2018 |
| CN | 109071737 A | 12/2018 |
| CN | 110167978 A | 8/2019 |
| JP | 2019512584 A | 5/2019 |
| JP | 2020524204 A | 8/2020 |
| KR | 10-2000-0075768 A | 12/2000 |
| KR | 10-2007-0117315 A | 12/2007 |
| KR | 10-2010-0060790 A | 6/2010 |
| KR | 10-2011-0088803 A | 8/2011 |

(Continued)

OTHER PUBLICATIONS

Partial machine translation of KR 10-2018-0107387 (Year: 2018).*
The Office Action for Indian Patent Application No. 202117036697, dated Aug. 30, 2023.
M. Rheem, et al. "Synthesis of Thermally Expandable Microspheres Using Ethoxylated Trimethylolpropane Triacrylates as Crosslinking Agents", Polymer Korea, vol. 42, No. 6, pp. 1068-1076, 2018.
Extended European Search Report for related application EP 20898737.0, mailed Mar. 24, 2022.

*Primary Examiner* — Kregg T Brooks

(57) ABSTRACT

The present invention relates to an alkyl acrylate compound-vinyl cyanide compound-aromatic vinyl compound graft copolymer including a seed prepared by polymerizing one or more compounds selected from the group consisting of an alkyl acrylate compound, an aromatic vinyl compound, and a vinyl cyanide compound and a multifunctional crosslinking agent; a core formed to surround the seed and prepared by polymerizing an alkyl acrylate compound and a multifunctional crosslinking agent; and a graft shell formed to surround the core and prepared by polymerizing an aromatic vinyl compound and a vinyl cyanide compound, wherein the multifunctional crosslinking agent has a weight average molecular weight of 600 to 1,400 g/mol, a method of preparing the alkyl acrylate compound-vinyl cyanide compound-aromatic vinyl compound graft copolymer, and a thermoplastic resin composition including the alkyl acrylate compound-vinyl cyanide compound-aromatic vinyl compound graft copolymer.

12 Claims, No Drawings

(56) References Cited

FOREIGN PATENT DOCUMENTS

| | | |
|---|---|---|
| KR | 10-2013-0078199 A | 7/2013 |
| KR | 10-2015-0026532 A | 3/2015 |
| KR | 10-2017-0050086 A | 5/2017 |
| KR | 10-2018-0107387 A | 10/2018 |
| KR | 10-2019-0071572 A | 6/2019 |
| WO | WO-2019021683 A1 * | 1/2019 ................ C08F 2/24 |

* cited by examiner

ALKYL ACRYLATE COMPOUND-VINYL CYANIDE COMPOUND-AROMATIC VINYL COMPOUND GRAFT COPOLYMER, METHOD OF PREPARING THE SAME, AND THERMOPLASTIC RESIN COMPOSITION INCLUDING THE SAME

TECHNICAL FIELD

Cross-Reference to Related Application

This application is a national phase of International Application No. PCT/KR2020/015182, which claims priority to Korean Patent Application No. 10-2019-0163480, filed on Dec. 10, 2019 in the Korean Intellectual Property Office, the disclosures of which is are incorporated herein by reference.

The present invention relates to an alkyl acrylate compound-vinyl cyanide compound-aromatic vinyl compound graft copolymer, a method of preparing the same, and a thermoplastic resin composition including the same. More particularly, the present invention relates to an alkyl acrylate compound-vinyl cyanide compound-aromatic vinyl compound graft copolymer having excellent appearance properties such as gloss and colorability, mechanical properties such as impact strength and elongation rate, and processability; a method of preparing the alkyl acrylate compound-vinyl cyanide compound-aromatic vinyl compound graft copolymer; and a thermoplastic resin composition including the alkyl acrylate compound-vinyl cyanide compound-aromatic vinyl compound graft copolymer.

BACKGROUND ART

ABS resins, which are acrylonitrile-butadiene-styrene terpolymers, have excellent impact resistance, rigidity, chemical resistance, and processability, and thus have been used in various fields such as electric and electronic components, buildings, and automobile components. However, since a butadiene rubber polymer is used in preparation of an ABS resin, the ABS resin is used after being painted because of poor weather resistance thereof. At this time, painting may cause environmental pollution. In addition, it is difficult to recycle the painted product, and durability thereof may be deteriorated.

To solve these problems, ASA resins (acrylate-styrene-acrylonitrile copolymers) containing a crosslinked alkyl acrylate rubber polymer without containing an ethylenically unsaturated polymer causing ultraviolet-induced aging have been developed. ASA resins have excellent weather resistance, impact strength, and colorability, but have a disadvantage in that the appearance properties thereof such as gloss are inferior to those of painted ABS resins. In addition, demand for ASA resins having high weather resistance is increasing.

Therefore, in accordance with the needs of consumers, an ASA resin having excellent weather resistance, appearance properties such as gloss and colorability, and mechanical properties needs to be developed.

RELATED ART DOCUMENTS

[Patent Documents]
KR 2010-0060790 A

DISCLOSURE

Technical Problem

Therefore, the present invention has been made in view of the above problems, and it is one object of the present invention to provide an alkyl acrylate compound-vinyl cyanide compound-aromatic vinyl compound graft copolymer having excellent appearance properties such as gloss and colorability, mechanical properties, and processability.

It is another object of the present invention to provide a method of preparing the alkyl acrylate compound-vinyl cyanide compound-aromatic vinyl compound graft copolymer.

It is yet another object of the present invention to provide a thermoplastic resin composition including the alkyl acrylate compound-vinyl cyanide compound-aromatic vinyl compound graft copolymer.

The above and other objects can be accomplished by the present disclosure described below.

Technical Solution

In accordance with one aspect of the present invention, provided is an alkyl acrylate compound-vinyl cyanide compound-aromatic vinyl compound graft copolymer including a seed prepared by polymerizing one or more compounds selected from the group consisting of an alkyl acrylate compound, an aromatic vinyl compound, and a vinyl cyanide compound and a multifunctional crosslinking agent; a core formed to surround the seed and prepared by polymerizing an alkyl acrylate compound and a multifunctional crosslinking agent; and a graft shell formed to surround the core and prepared by polymerizing an aromatic vinyl compound and a vinyl cyanide compound, wherein the multifunctional crosslinking agent has a weight average molecular weight of 600 to 1,400 g/mol.

In accordance with another aspect of the present invention, provided is a method of preparing an alkyl acrylate compound-vinyl cyanide compound-aromatic vinyl compound graft copolymer, the method including a seed polymerization step of preparing a seed by polymerizing one or more compounds selected from the group consisting of an alkyl acrylate compound, an aromatic vinyl compound, and a vinyl cyanide compound and a multifunctional crosslinking agent; a core polymerization step of preparing a core by polymerizing an alkyl acrylate compound and a multifunctional crosslinking agent in the presence of the seed; and a graft shell polymerization step of preparing a graft shell by polymerizing an aromatic vinyl compound and a vinyl cyanide compound in the presence of the core, wherein the multifunctional crosslinking agent has a weight average molecular weight of 600 to 1,400 g/mol.

In accordance with still another aspect of the present invention, provided is a thermoplastic resin composition including 15 to 65% by weight of the alkyl acrylate compound-vinyl cyanide compound-aromatic vinyl compound graft copolymer; 0 to 30% by weight of an acrylate-aromatic vinyl compound-vinyl cyanide compound graft copolymer containing acrylate rubber as a core having an average particle diameter of 50 to 300 nm; and 30 to 70% by weight of a matrix resin.

In accordance with yet another aspect of the present invention, provided is a molded article manufactured using the thermoplastic resin composition.

Advantageous Effects

As apparent from the foregoing, the present invention advantageously provides an alkyl acrylate compound-vinyl cyanide compound-aromatic vinyl compound graft copolymer having excellent appearance properties such as gloss and colorability, mechanical properties, and processability; a method of preparing the same; and a thermoplastic resin composition including the same.

BEST MODE

Hereinafter, an alkyl acrylate compound-vinyl cyanide compound-aromatic vinyl compound graft copolymer, a method of preparing the same, and a thermoplastic resin composition including the same according to the present invention will be described in detail.

The present inventors confirmed that, when an alkyl acrylate compound-vinyl cyanide compound-aromatic vinyl compound graft copolymer was prepared, when a predetermined multifunctional crosslinking agent was added to a seed and a core constituting the graft copolymer, appearance properties such as gloss and colorability, mechanical properties such as impact strength and elongation rate, and processability were improved. Based on these results, the present inventors conducted further studies to complete the present invention.

Alkyl Acrylate Compound-Vinyl Cyanide Compound-Aromatic Vinyl Compound Graft Copolymer The alkyl acrylate compound-vinyl cyanide compound-aromatic vinyl compound graft copolymer of the present invention includes a seed prepared by polymerizing one or more compounds selected from the group consisting of an alkyl acrylate compound, an aromatic vinyl compound, and a vinyl cyanide compound and a multifunctional crosslinking agent; a core formed to surround the seed and prepared by polymerizing an alkyl acrylate compound and a multifunctional crosslinking agent; and a graft shell formed to surround the core and prepared by polymerizing an aromatic vinyl compound and a vinyl cyanide compound. In this case, the multifunctional crosslinking agent has a weight average molecular weight of 600 to 1,400 g/mol. In this case, appearance properties such as gloss and colorability, mechanical properties, and processability may be excellent.

Each component constituting the alkyl acrylate compound-vinyl cyanide compound-aromatic vinyl compound graft copolymer of the present invention (hereinafter referred to as "graft copolymer") will be described in detail.

Seed

For example, the seed may be prepared by polymerizing one or more compounds selected from the group consisting of an alkyl acrylate compound, an aromatic vinyl compound, and a vinyl cyanide compound and a multifunctional crosslinking agent. In this case, appearance properties such as gloss and colorability, mechanical properties, and processability may be excellent.

As a specific example, based on 100 parts by weight in total of monomers used in preparation of the graft copolymer, the seed may be a rubber polymer prepared by polymerizing 1 to 20% by weight, preferably 3 to 15% by weight, more preferably 5 to 10% by weight of one or more compounds selected from the group consisting of an alkyl acrylate compound, an aromatic vinyl compound, and a vinyl cyanide compound and 0.005 to 0.1 parts by weight, preferably 0.01 to 0.08 parts by weight, more preferably 0.02 to 0.06 parts by weight of a multifunctional crosslinking agent. Within these ranges, the crosslinking network of the seed rubber may be improved, thereby achieving excellent appearance properties such as gloss and colorability, mechanical properties, and processability.

In the present specification, the monomers refer to the aromatic vinyl compound, the vinyl cyanide compound, and the alkyl acrylate compound included in the graft copolymer.

In the present specification, "% by weight" is a unit representing the weight of a component based on 100% by weight in total of the alkyl acrylate compound, the aromatic vinyl compound, and the vinyl cyanide compound fed when the seed, the core, and the graft shell are prepared. "Parts by weight" is a unit representing the weight of a component based on 100 parts by weight in total of the alkyl acrylate compound, the aromatic vinyl compound, and the vinyl cyanide compound.

In the present specification, 100 parts by weight of the graft copolymer means 100 parts by weight of the finally obtained graft copolymer, 100 parts by weight in total of the seed, core, and graft shell monomers, or 100 parts by weight in total of monomers fed when the graft copolymer is prepared.

In the present specification, the multifunctional crosslinking agent refers to a compound having three or more functional groups that may be linked by reacting with a polymer or a monomer, and may serve to crosslink the chains of a polymer.

For example, the seed may have an average particle diameter of 50 to 500 nm, preferably 100 to 400 nm, more preferably 150 to 300 nm. Within this range, impact strength, weather resistance, and gloss may be excellent.

In the present specification, an average particle diameter may be measured by dynamic light scattering. Specifically, an average particle diameter may be measured using a sample in latex form using a Nicomp 380 particle size analyzer in a Gaussian mode, and may mean an arithmetic average particle diameter in a particle size distribution measured by dynamic light scattering, specifically, an average particle diameter of scattering intensity.

For example, the multifunctional crosslinking agent may have a weight average molecular weight of 600 to 1,400 g/mol, preferably 650 to 1,200 g/mol, more preferably 650 to 1,100 g/mol. Within this range, appearance properties such as gloss and colorability, mechanical properties, and processability may be excellent.

In the present specification, weight average molecular weight may be measured at 40° C. using tetrahydrofuran (THF) as an eluate using a gel permeation chromatograph (GPC) filled with porous silica as a column packing material. In this case, weight average molecular weight is obtained as a relative value to a polystyrene standard (PS) specimen.

For example, the multifunctional crosslinking agent may have 3 or more functional groups, preferably 3 to 10 functional groups, more preferably 3 to 5 functional groups, still more preferably 3 functional groups. Within this range, excellent appearance properties such as gloss and colorability, mechanical properties, and processability may be achieved.

For example, the multifunctional crosslinking agent may be a compound represented by Chemical Formula 1 below. In this case, appearance properties, such as gloss and colorability, and mechanical properties may be excellent.

[Chemical Formula 1]

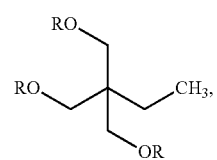

wherein R is

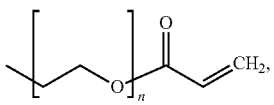

wherein n is an integer of 3 to 6.

For example, the seed may be a rubber polymer prepared using one or more selected from the group consisting of an emulsifier, a grafting agent, an initiator, and an electrolyte. In this case, impact strength, elongation rate, weather resistance, gloss, and colorability may be excellent.

For example, based on 100 parts by weight in total of monomers used in preparation of the graft copolymer, the seed may be a rubber polymer containing 0.03 to 0.25 parts by weight, preferably 0.05 to 0.2 parts by weight of the emulsifier. Within this range, impact strength, weather resistance, and gloss may be excellent.

For example, based on 100 parts by weight in total of monomers used in preparation of the graft copolymer, the seed may include 0.01 to 3 parts by weight, preferably 0.01 to 1 part by weight, more preferably 0.01 to 0.5 parts by weight of the grafting agent. Within this range, the grafting degree of a graft polymer may be improved, and other physical properties may also be improved.

For example, based on 100 parts by weight in total of monomers used in preparation of the graft copolymer, the seed may include 0.01 to 3 parts by weight, preferably 0.03 to 2 parts by weight, more preferably 0.03 to 1 part by weight of the initiator. Within this range, impact strength and weather resistance may be excellent.

For example, based on 100 parts by weight in total of monomers used in preparation of the graft copolymer, the seed may include 0.05 to 1 part by weight, preferably 0.1 to 0.7 parts by weight of the electrolyte. Within this range, polymerization stability and latex stability may be improved.

Core

For example, the core may be prepared by polymerizing an alkyl acrylate compound and a multifunctional crosslinking agent in the presence of the seed. In this case, appearance properties such as gloss and colorability, mechanical properties, and processability may be excellent.

As a specific example, based on 100 parts by weight in total of monomers used in preparation of the graft copolymer, the core may be prepared by polymerizing 35 to 65% by weight, preferably 40 to 60% by weight, more preferably 45 to 55% by weight of an alkyl acrylate compound and 0.04 to 0.8 parts by weight, preferably 0.06 to 0.6 parts by weight, more preferably 0.08 to 0.3 parts by weight of a multifunctional crosslinking agent. Within these ranges, the crosslinking network of a rubber component may be improved, thereby achieving excellent appearance properties, such as gloss and colorability, and mechanical properties.

The multifunctional crosslinking agent included in the core may be the same as the multifunctional crosslinking agent used in preparation of the seed.

For example, the core including the seed may have an average particle diameter of 300 to 700 nm, preferably 350 to 600 nm, more preferably 350 to 500 nm, still more preferably 400 to 500 nm (here, since the core contains the seed, the average particle diameter of the core is larger than that of the seed). Within this range, appearance properties such as colorability and mechanical properties may be excellent. When the core has an average particle diameter less than the above range, impact strength may be decreased. When the core has an average particle diameter exceeding the above range, appearance properties such as colorability may deteriorate.

As a preferred example, the multifunctional crosslinking agent is included in the seed and the core and is not included in the graft shell. In this case, appearance properties, such as gloss and colorability, and mechanical properties may be excellent.

For example, the core may be a rubber polymer prepared using one or more selected from the group consisting of an emulsifier, a grafting agent, and an initiator. In this case, impact strength, elongation rate, weather resistance, gloss, and colorability may be excellent.

For example, based on 100 parts by weight in total of monomers used in preparation of the graft copolymer, the core may include 0.2 to 1 part by weight, preferably 0.5 to 0.7 parts by weight of the emulsifier. Within this range, impact strength, weather resistance, and gloss may be excellent.

For example, based on 100 parts by weight in total of monomers used in preparation of the graft copolymer, the core may include 0.1 to 1.0 part by weight, preferably 0.2 to 0.7 parts by weight of the grafting agent. Within this range, impact strength, weather resistance, and gloss may be excellent.

For example, based on 100 parts by weight in total of monomers used in preparation of the graft copolymer, the core may include 0.01 to 1 part by weight, preferably 0.05 to 0.7 parts by weight of the initiator. Within this range, impact strength, weather resistance, and gloss may be excellent.

Graft Shell

For example, the graft shell may be prepared by polymerizing an aromatic vinyl compound and a vinyl cyanide compound in the presence of the core. In this case, appearance properties such as gloss and colorability, mechanical properties such as impact strength and elongation rate, and processability may be excellent.

For example, based on 100 parts by weight in total of monomers used in preparation of the graft copolymer, the graft shell may include 30 to 60% by weight, preferably 35 to 55% by weight, more preferably 40 to 50% by weight of an aromatic vinyl compound and a vinyl cyanide compound. Within this range, an appropriate grafting rate may be obtained, and impact resistance and weather resistance may be improved.

For example, based on the total weight of the shell, the graft shell may include 60 to 80% by weight of an aromatic vinyl compound and 20 to 40% by weight of a vinyl cyanide compound, preferably 65 to 75% by weight of an aromatic vinyl compound and 25 to 35% by weight of a vinyl cyanide compound. Within this range, an appropriate grafting rate may be obtained, and impact resistance and weather resistance may be improved.

For example, the graft shell does not include a multifunctional crosslinking agent.

For example, the graft shell including the core may have an average particle diameter of 400 to 800 nm, preferably 450 to 650 nm, more preferably 500 to 600 nm (here, since the graft shell includes the core, the average particle diameter of the graft shell is larger than that of the core). Within this range, appearance properties such as colorability and gloss, mechanical properties, and processability may be excellent.

For example, the graft shell may be a polymer prepared using one or more selected from the group consisting of an initiator, an emulsifier, and an electrolyte. In this case, impact strength, elongation rate, weather resistance, gloss, and colorability may be excellent.

For example, based on 100 parts by weight in total of monomers used in preparation of the graft copolymer, the initiator may be included in the graft shell in an amount of 0.05 to 1 part by weight, preferably 0.1 to 0.5 parts by weight. Within this range, polymerization may be easily performed, thereby improving impact strength and weather resistance.

For example, based on 100 parts by weight in total of monomers used in preparation of the graft copolymer, the emulsifier may be included in the graft shell in an amount of 0.01 to 3 parts by weight, preferably 0.5 to 2 parts by weight. Within this range, polymerization may be easily performed, thereby improving impact strength and weather resistance.

For example, based on 100 parts by weight of the graft copolymer, the electrolyte may be included in the graft shell in an amount of 0.005 to 0.4 parts by weight, preferably 0.05 to 0.2 parts by weight. Within this range, polymerization may be easily performed, thereby improving impact strength and weather resistance.

As the initiator of the present invention, any initiator commonly used in the art to which the present invention pertains may be used without particular limitation. For example, a water-soluble initiator, a fat-soluble initiator, or a mixture thereof may be used.

For example, the water-soluble initiator may include one or more selected from the group consisting of sodium persulfate, potassium persulfate, ammonium persulfate, potassium superphosphate, and hydrogen peroxide, without being limited thereto.

For example, the fat-soluble initiator may include one or more selected from the group consisting of t-butyl peroxide, cumene hydroperoxide, p-methane hydroperoxide, di-t-butyl peroxide, t-butyl cumyl peroxide, acetyl peroxide, isobutyl peroxide, octanoyl peroxide, dibenzoyl peroxide, diisopropylbenzene hydroperoxide, 3,5,5-trimethylhexanol peroxide, t-butyl peroxy isobutyrate, azobisisobutyronitrile, azobis-2,4-dimethylvaleronitrile, azobiscyclohexanecarbonitrile, and azobis(isobutyric acid methyl), without being limited thereto.

As a preferred example, in a seed preparation step and/or a core preparation step of the present invention, a water-soluble initiator may be used. When a water-soluble initiator is used in the steps, reaction rate is controlled so that a polymer having a desired size may be easily prepared.

As another preferred example, in a graft shell copolymer preparation step, a fat-soluble initiator may be used. When a fat-soluble initiator is used in the step, high polymerization rate may be achieved, thereby increasing the productivity of a resin.

In the present specification, for example, the electrolyte may include one or more selected from the group consisting of KCl, NaCl, KHCO$_3$, NaHCO$_3$, K$_2$CO$_3$, Na$_2$CO$_3$, KHSO$_3$, NaHSO$_3$, K$_4$P$_2$O$_7$, Na$_4$P$_2$O$_7$, K$_3$PO$_4$, Na$_3$PO$_4$, K$_2$HPO$_4$, Na$_2$HPO$_4$, KOH, NaOH, and Na$_2$S$_2$O$_7$, without being limited thereto.

In the present specification, a compound containing unsaturated vinyl groups having two or more different reactivities may be used as the grafting agent. For example, the grafting agent may include one or more selected from the group consisting of allyl methacrylate, triallyl isocyanurate, triallylamine, and diallylamine, without being limited thereto.

In the present specification, for example, the emulsifier may include one or more selected from the group consisting of sodium dodecyl sulfate, sodium dodecyl benzene sulfate, sodium octadecyl sulfate, sodium oleic sulfate, potassium dodecyl sulfate, potassium dodecyl benzene sulfate, sodium dodecyl benzene sulfonate, sodium lauryl sulfate, sodium oleate, potassium dodecyl benzenesulfonate, potassium octadecyl sulfate, potassium rosinate, and potassium oleate.

One or more steps of the seed preparation step, the core preparation step, and the graft shell preparation step according to the present invention preferably include an activator for further accelerating initiation reaction in addition to the above-described initiator, more preferably one or more selected from the group consisting of a compound containing divalent iron ions and a chelating agent, still more preferably, a mixture of a compound containing divalent iron ions and a chelating agent.

Preferably, the activator further includes one or more selected from the group consisting of sulfinato acetic acid metal salt and sulfonato acetic acid metal salt. In this case, weather resistance and colorability may be greatly improved while maintaining impact strength.

For example, the metal salt may be an alkali metal salt, preferably a sodium salt. In this case, weather resistance and colorability may be greatly improved while maintaining impact strength.

The sulfinato acetic acid metal salt and the sulfonato acetic acid metal salt may independently include one or more functional groups. The function groups preferably include a hydroxyl group. In this case, weather resistance and colorability may be greatly improved while maintaining impact strength.

In the present specification, for example, the alkyl acrylate compound may be an alkyl acrylate containing an alkyl group having 1 to 15 carbon atoms. As a specific example, the alkyl acrylate compound may include one or more selected from the group consisting of methyl acrylate, ethyl acrylate, propyl acrylate, butyl acrylate, 2-ethylbutyl acrylate, octyl acrylate, 2-ethylhexyl acrylate, hexyl acrylate, heptyl acrylate, n-pentyl acrylate, and lauryl acrylate, preferably an alkyl acrylate containing a chained alkyl group having 1 to 4 carbon atoms, more preferably butyl acrylate.

In the present specification, for example, the aromatic vinyl compound may include one or more selected from the group consisting of styrene, α-methyl styrene, o-methyl styrene, ρ-methyl styrene, m-methyl styrene, ethyl styrene, isobutyl styrene, t-butyl styrene, o-bromostyrene, ρ-bromostyrene, m-bromostyrene, o-chlorostyrene, ρ-chlorostyrene, m-chlorostyrene, vinyltoluene, vinylxylene, fluorostyrene, and vinylnaphthalene, preferably styrene. In this case, due to appropriate fluidity, processability and mechanical properties such as impact resistance may be excellent.

In the present specification, for example, the vinyl cyanide compound may include one or more selected from the group consisting of acrylonitrile, methacrylonitrile, ethylacrylonitrile, and isopropylacrylonitrile, preferably acrylonitrile.

Method of Preparing Alkyl Acrylate Compound-Vinyl Cyanide Compound-Aromatic Vinyl Compound Graft Copolymer A method of preparing an alkyl acrylate compound-vinyl cyanide compound-aromatic vinyl compound graft copolymer of the present invention includes a seed polymerization step of preparing a seed by polymerizing one or more compounds selected from the group consisting of an alkyl acrylate compound, an aromatic vinyl compound, and a vinyl cyanide compound and a multifunctional crosslinking agent; a core polymerization step of preparing a core by polymerizing an alkyl acrylate compound and a multifunctional crosslinking agent in the presence of the seed; and a graft shell polymerization step of preparing a graft shell by polymerizing an aromatic vinyl compound and a vinyl cyanide compound in the presence of the core. In this case, the multifunctional crosslinking agent has a weight average molecular weight of 600 to 1,400 g/mol. In this case, appearance properties, such as gloss and colorability, and mechanical properties may be excellent.

The multifunctional crosslinking agent may be the same as the multifunctional crosslinking agent used in preparation of the seed and the core included in the graft copolymer.

For example, in the seed preparation step, the seed may be prepared using one or more selected from the group consisting of an emulsifier, a grafting agent, an initiator, and an electrolyte. In this case, impact strength, elongation rate, weather resistance, gloss, and colorability may be excellent.

For example, in the core preparation step, the core may be prepared using one or more selected from the group consisting of an emulsifier, a grafting agent, and an initiator. In this case, impact strength, elongation rate, weather resistance, gloss, and colorability may be excellent.

For example, in the graft shell preparation step, the graft shell may be prepared using one or more selected from the group consisting of an initiator, an emulsifier, and an electrolyte may be used. In this case, impact strength, elongation rate, weather resistance, gloss, and colorability may be excellent.

The contents of the emulsifier, the grafting agent, the initiator, the crosslinking agent, and the electrolyte included in the seed preparation step, the core preparation step, and the graft shell preparation step may be the same as the contents of the emulsifier, the grafting agent, the initiator, the crosslinking agent, and the electrolyte used to prepare the graft copolymer.

In addition to the initiator, an activator may be used to facilitate initiation reaction of a peroxide.

For example, the activator may be the same as the activator used in preparation of the graft copolymer.

For example, graft copolymer latex prepared in the shell preparation step may be prepared in powder form after coagulation, aging, dehydration, washing, and drying.

For example, the coagulation may be performed using one or more selected from the group consisting of sulfuric acid, $MgSO_4$, $CaCl_2$, and $Al_2(SO_4)_3$, preferably $CaCl_2$.

Specifically, when the graft copolymer latex is prepared, coagulation is performed at 65 to 80° C. under normal pressure using an aqueous calcium chloride solution, aging is performed at 90 to 95° C., dehydration and washing are performed, and then drying is performed with hot blast at 85 to 95° C. for 20 to 40 minutes to obtain powdered copolymer particles.

In the present specification, the normal pressure means atmospheric pressure, specifically 1 atmosphere of pressure.

For example, the graft copolymer may be prepared by emulsion polymerization. In this case, impact strength, tensile strength, weather resistance, and gloss may be excellent.

As the emulsion polymerization of the present invention, any emulsion graft polymerization method commonly practiced in the art to which the present invention pertains may be used without particular limitation.

The alkyl acrylate compound, the aromatic vinyl compound, and the vinyl cyanide compound included in the graft copolymer preparation method may be the same as the alkyl acrylate compound, the aromatic vinyl compound, and the vinyl cyanide compound used to prepare the graft copolymer.

Thermoplastic Resin Composition

For example, a thermoplastic resin composition of the present invention may include 15 to 65% by weight of the alkyl acrylate compound-vinyl cyanide compound-aromatic vinyl compound graft copolymer; 0 to 30% by weight of an acrylate-aromatic vinyl compound-vinyl cyanide compound graft copolymer containing acrylate rubber as a core having an average particle diameter of 50 to 300 nm; and 30 to 70% by weight of a matrix resin. In this case, impact strength may be increased, and colorability, gloss, processability, and weather resistance may be excellent.

The thermoplastic resin composition preferably includes 15 to 50% by weight of the alkyl acrylate compound-vinyl cyanide compound-aromatic vinyl compound graft copolymer, 5 to 25% by weight of an acrylate-aromatic vinyl compound-vinyl cyanide compound graft copolymer containing acrylate rubber as a core having an average particle diameter of 50 to 300 nm, and 40 to 70% by weight of a matrix resin. In this case, impact strength may be increased, and colorability, gloss, processability, and weather resistance may be excellent.

More preferably, the thermoplastic resin composition includes 20 to 35% by weight of the alkyl acrylate compound-vinyl cyanide compound-aromatic vinyl compound graft copolymer, 15 to 25% by weight of an acrylate-aromatic vinyl compound-vinyl cyanide compound graft copolymer containing acrylate rubber as a core having an average particle diameter of 50 to 300 nm, and 50 to 65% by weight of a matrix resin. In this case, impact strength may be increased, and colorability, gloss, processability, and weather resistance may be excellent.

For example, the acrylate-aromatic vinyl compound-vinyl cyanide compound graft copolymer containing acrylate rubber as a core having an average particle diameter of 50 to 300 nm (hereinafter referred to as "small-diameter graft copolymer") may be a copolymer prepared by polymerizing 40 to 60% by weight of acrylate rubber, 25 to 45% by weight of an aromatic vinyl compound, and 1 to 20% by weight of a vinyl cyanide compound. Within this range, impact strength, tensile strength, weather resistance, and surface gloss may be excellent.

As a preferred example, the small-diameter graft copolymer may be a copolymer prepared by polymerizing 45 to 55% by weight of acrylate rubber, 30 to 40% by weight of an aromatic vinyl compound, and 10 to 20% by weight of a vinyl cyanide compound. Within this range, impact strength, tensile strength, weather resistance, and surface gloss may be excellent.

The acrylate rubber core preferably has an average particle diameter of 50 to 250 nm, more preferably 100 to 200 nm. Within this range, impact strength, tensile strength, weather resistance, and surface gloss may be excellent.

For example, the small-diameter graft copolymer may be prepared by emulsion polymerization. In this case, impact strength, tensile strength, weather resistance, and surface gloss may be excellent.

As the emulsion polymerization of the present invention, any emulsion graft polymerization method commonly practiced in the art to which the present invention pertains may be used without particular limitation.

For example, the matrix resin may be a polymer prepared by polymerizing one or more monomers selected from the group consisting of an aromatic vinyl compound, a vinyl cyanide compound, and a (meth)acrylic acid alkyl ester compound, preferably a vinyl cyanide compound-aromatic vinyl compound copolymer. In this case, impact strength may be increased, and colorability, gloss, and weather resistance may be excellent.

For example, the vinyl cyanide compound-aromatic vinyl compound copolymer is preferably a styrene-acrylonitrile copolymer (SAN resin), an α-methylstyrene-acrylonitrile copolymer (heat resistant SAN resin), or a mixture thereof, more preferably a styrene-acrylonitrile copolymer (SAN resin). In this case, processability, weather resistance, and colorability may be excellent.

The styrene-acrylonitrile copolymer is preferably a copolymer prepared by polymerizing 65 to 85% by weight of styrene and 15 to 35% by weight of acrylonitrile. In this case, processability, weather resistance, and colorability may be excellent.

For example, the vinyl cyanide compound-aromatic vinyl compound copolymer may be prepared by suspension polymerization, emulsion polymerization, solution polymerization, or bulk polymerization, preferably bulk polymerization. In this case, heat resistance and fluidity may be excellent.

Unless otherwise specified in the present description, the (meth)acrylic acid alkyl ester may be an acrylic acid alkyl ester or a methacrylic acid alkyl ester. For example, the (meth)acrylic acid alkyl ester may include one or more selected from the group consisting of (meth)acrylic acid methyl ester, (meth)acrylic acid ethyl ester, (meth)acrylic acid propyl ester, (meth)acrylic acid 2-ethylhexyl ester, (meth)acrylic acid decyl ester, and (meth)acrylic acid lauryl ester.

For example, the thermoplastic resin composition may have a gloss of 74 or more, preferably 74 to 90, more preferably 76 to 85, still more preferably 80 to 85 as measured at an angle of 45° according to ASTM D528. Within this range, physical property balance may be excellent.

For example, the thermoplastic resin composition may have a blackness (color L value) of 28.2 or less, preferably 20 to 28.2, more preferably 25 to 28 as measured using a color meter (Color Eye 7000A, GRETAGMACBETH Co.) according to a CIE1976 L*a*b* color space. Within this range, physical property balance may be excellent.

For example, the thermoplastic resin composition may have an impact strength (⅛", 23° C.) of 23 kgf·cm/cm or more, preferably 23 to 40 kgf·cm/cm, more preferably 28 to 35 kgf·cm/cm as measured according to ASTM D256. Within this range, physical property balance may be excellent.

For example, in the present specification, elongation rate is measured according to ASTM D638. Specifically, a specimen is pulled at a cross head speed of 200 mm/min using a universal testing machine (Model: 4466, Instron Co.), and then a point at which the specimen is truncated is measured. Then, elongation rate is calculated by substituting the measured results into Equation 1 below. According to this method, the elongation rate of the thermoplastic resin composition may 33% or more, preferably 33 to 45%, more preferably 35 to 42%. Within this range, physical property balance may be excellent.

Elongation rate (%)=Length after elongation/initial length×100 [Equation 1]

For example, the thermoplastic resin composition may have a flow index of 13 g/10 min or more, preferably 13 to 14 g/10 min, more preferably 13 to 13.5 g/10 min as measured under conditions of 220° C. and 10 kg according to ASTM D1238. Within this range, physical property balance may be excellent.

The thermoplastic resin composition may further include one or more additives selected from the group consisting of a flame retardant, a lubricant, an antibacterial agent, a release agent, a nucleating agent, a plasticizer, a heat stabilizer, an antioxidant, a light stabilizer, an ultraviolet stabilizer, a pigment, a dye, and a compatibilizer. Based on 100 parts by weight of a composition including the alkyl acrylate compound-vinyl cyanide compound-aromatic vinyl compound graft copolymer, the small-diameter graft copolymer, and the matrix resin, the additives are preferably included in an amount of 0.1 to 10 parts by weight, more preferably 1 to 7 parts by weight, still more preferably 1 to 5 parts by weight. Within this range, the desired effect of the additives may be fully expressed without deterioration in the intrinsic physical properties of a resin.

For example, the lubricant may include one or more selected from the group consisting of ethylene bis stearamide, oxidized polyethylene wax, and magnesium stearate, preferably ethylene bis stearamide. In this case, the wettability of the composition of the present invention may be improved, and the mechanical properties thereof may be excellent.

For example, based on 100 parts by weight in total of the alkyl acrylate compound-vinyl cyanide compound-aromatic vinyl compound graft copolymer, the small-diameter graft copolymer, and the matrix resin, the lubricant may be included in an amount of 0.1 to 3 parts by weight, preferably 0.1 to 2 parts by weight, more preferably 0.05 to 1.5 parts by weight. Within this range, the wettability of the composition of the present invention may be improved, and the mechanical properties thereof may be excellent.

For example, the antioxidant may include phenolic antioxidants, phosphorus antioxidants, or mixtures thereof. In this case, oxidation due to heat during an extrusion process may be prevented, and mechanical properties may be excellent.

For example, based on 100 parts by weight in total of the alkyl acrylate compound-vinyl cyanide compound-aromatic vinyl compound graft copolymer, the small-diameter graft copolymer, and the matrix resin, the antioxidant may be included in an amount of 0.01 to 3 parts by weight, preferably 0.01 to 1 part by weight, more preferably 0.1 to 1 part by weight. Within this range, oxidation due to heat during an extrusion process may be prevented, and mechanical properties may be excellent.

For example, based on 100 parts by weight in total of the alkyl acrylate compound-vinyl cyanide compound-aromatic vinyl compound graft copolymer, the small-diameter graft copolymer, and the matrix resin, the dye may be included in an amount of 0.1 to 1.5 parts by weight, preferably 0.5 to 1 part by weight. Within this range, color expression may be excellent without deterioration in the intrinsic physical properties of the thermoplastic resin composition of the present invention.

Method of Preparing Thermoplastic Resin Composition

For example, a method of preparing a thermoplastic resin composition of the present invention includes a step of mixing 15 to 65% by weight of the alkyl acrylate compound-vinyl cyanide compound-aromatic vinyl compound graft copolymer, 0 to 30% by weight of an acrylate-aromatic vinyl compound-vinyl cyanide compound graft copolymer containing acrylate rubber as a core having an average particle diameter of 50 to 300 nm, and 30 to 70% by weight of a matrix resin and preparing pellets at 200 to 250° C. using an extrusion kneader. In this case, a thermoplastic resin composition having excellent weather resistance, gloss, and colorability while having mechanical properties and processability equal or superior to those of conventional ASA resins may be provided.

The method of preparing a thermoplastic resin composition shares all the technical characteristics of the thermoplastic resin composition described above, and thus repeated description thereof will be omitted.

The step of preparing pellets using an extrusion kneader is preferably performed at 200 to 250° C., more preferably 210 to 230° C. In this case, the temperature means temperature set in a cylinder.

As the extrusion kneader of the present invention, any extrusion kneader commonly used in the art to which the present invention pertains may be used without particular limitation. The extrusion kneader of the present invention is preferably a twin-screw extrusion kneader.

Molded Article

A molded article of the present invention includes the thermoplastic resin composition of the present invention. In this case, a molded article having excellent weather resistance and appearance properties such as gloss and colorability while having mechanical properties and processability equal or superior to those of conventional molded articles may be provided.

For example, the molded article may be a car lamp housing or a sheet for furniture.

In description of the thermoplastic resin composition, the method of preparing the same, and the molded article according to the present invention, it should be noted that other conditions or equipment not explicitly described may be appropriately selected within the range commonly practiced in the art without particular limitation.

Hereinafter, the present invention will be described in more detail with reference to the following preferred examples. However, these examples are provided for illustrative purposes only and should not be construed as limiting the scope and spirit of the present invention. In addition, it will be apparent to those skilled in the art that various changes and modifications may be made without departing from the spirit and scope of the present invention, and such changes and modifications are also within the scope of the appended claims.

Examples

Materials used in Examples and Comparative Examples below are as follows.

M3130: Trimethylolpropane ethoxylate triacrylate having three functional groups and having a weight average molecular weight of 692 g/mol M3160: Trimethylolpropane ethoxylate triacrylate having three functional groups and having a weight average molecular weight of 1,088 g/mol M3190: Trimethylolpropane ethoxylate triacrylate having three functional groups and having a weight average molecular weight of 1,484 g/mol M300: Trimethylolpropane ethoxylate triacrylate having three functional groups and having a weight average molecular weight of 428 g/mol Bifunctional crosslinking agent: Ethylene glycol dimethacrylate having two functional groups and having a weight average molecular weight of 198 g/mol Example 1

<Graft Copolymer Preparation>
Seed Preparation

5% by weight of styrene, 2% by weight of acrylonitrile, 0.2 parts by weight of sodium dodecyl sulfate, 0.04 parts by weight of M3130 as a multifunctional crosslinking agent, 0.02 parts by weight of allyl methacrylate, 0.1 parts by weight of potassium hydroxide, and 50 parts by weight of distilled water were fed into a nitrogen-substituted reactor batchwise, temperature was raised to 70° C., and then 0.04 parts by weight of potassium persulfate as an initiator was added thereto to initiate reaction. Then, polymerization was performed for 2.0 hours. After completion of polymerization, a seed having an average particle diameter of 234 nm was obtained.

Core Preparation

A mixture containing 50% by weight of butyl acrylate, 0.5 parts by weight of sodium dodecyl sulfate, 0.2 parts by weight of M3130 as a multifunctional crosslinking agent, 0.2 parts by weight of allyl methacrylate, 15 parts by weight of distilled water, and 0.05 parts by weight of potassium persulfate was continuously fed at 70° C. for 4.0 hours in the presence of the seed. After completion of feeding, polymerization was further performed for 1 hour. After completion of reaction, a rubber core having an average particle diameter of 474 nm was obtained.

Graft Shell Preparation

Each of an emulsion containing 23 parts by weight of distilled water, 31.5% by weight of styrene, 11.5% by weight of acrylonitrile, 1.5 parts by weight of potassium rosinate, and 0.1 parts by weight of cumene hydroperoxide and a mixed solution containing 0.09 parts by weight of sodium pyrophosphate, 0.12 parts by weight of dextrose, and 0.002 parts by weight of ferrous sulfide were continuously fed at 75° C. for 3.5 hours in the presence of the prepared core, and polymerization was performed. In addition, after the mixture was fed, reaction was further performed at 75° C. for 1 hour to increase polymerization conversion rate, and polymerization was terminated by cooling to 60° C. to prepare a graft copolymer latex.

It was confirmed that the graft copolymer latex had a polymerization conversion rate of 99% and an average particle diameter of 557 nm.

Graft Copolymer Powder Preparation

Based on 100 parts by weight (based on solids) of the prepared acrylate-styrene-acrylonitrile graft copolymer latex, 0.8 parts by weight of an aqueous calcium chloride solution was added, and coagulation was performed at 70° C. under normal pressure. Then, aging was performed at 93° C., dehydration and washing were performed, and drying was performed with hot blast at 90° C. for 30 minutes to prepare acrylate-styrene-acrylonitrile copolymer powder.

<Thermoplastic Resin Composition Preparation>

20 parts by weight of the prepared graft copolymer powder, 18 parts by weight of butylacrylate rubber-styrene-acrylonitrile copolymer (SA931, average particle diameter of core: 100 nm, LG Chemical Co.), 62 parts by weight of a styrene-acrylonitrile copolymer as a matrix (90HR, LG Chemical Co.), 1 part by weight of a lubricant, 0.5 parts by weight of an antioxidant, 0.5 parts by weight of a UV stabilizer, and 0.5 parts by weight of carbon black were added and mixed. The mixture was added to a 36 pi extrusion kneader at a cylinder temperature of 220° C. to prepare pellets. Then, the pellets were injection-molded to prepare a specimen.

Examples 2 to 4

Preparation procedures were performed in the same manner as in Example 1, except that the types and contents of multifunctional crosslinking agents included in a seed and a core in preparation of a graft copolymer were determined according to Table 1 below.

TABLE 1

| Multifunctional crosslinking agent | Example 1 | | Example 2 | | Example 3 | | Example 4 | |
|---|---|---|---|---|---|---|---|---|
| | Seed | Core | Seed | Core | Seed | Core | Seed | Core |
| M3130 | 0.04 | 0.2 | | | 0.02 | 0.1 | | |
| M3160 | | | 0.04 | 0.2 | | | 0.02 | 0.1 |

Comparative Examples 1 to 3 and Reference Examples 1 and 2

Preparation procedures were performed in the same manner as in Example 1, except that the types and contents of multifunctional crosslinking agents included in a seed and a core in preparation of a graft copolymer were determined according to Table 2 below.

TABLE 2

| Multifunctional crosslinking agent | Comparative Example 1 | | Comparative Example 2 | | Comparative Example 3 | | Reference Example 1 | | Reference Example 2 | |
|---|---|---|---|---|---|---|---|---|---|---|
| | Seed | Core | Seed | Core | Seed | Core | Seed | Core | Seed | Core |
| M3130 | | | | | | | 0.14 | 1.0 | 0.003 | 0.02 |
| M3190 | | | | | 0.04 | 0.2 | | | | |
| M300 | | | 0.04 | 0.2 | | | | | | |
| Bifunctional crosslinking agent | 0.04 | 0.2 | | | | | | | | |

Test Examples

The properties of the specimens prepared in Examples 1 to 4, Comparative Examples 1 to 3, and Reference Examples 1 and 2 were measured according to the following methods, and the results are shown in Tables 3 and 4 below.

Measurement methods

Polymerization conversion rate (%): Polymerization conversion rate may be defined as the weight % of monomers converted into a polymer until measurement with respect to 100% by weight in total of monomers added until polymerization is completed. 1.5 g of prepared latex was dried in a hot blast dryer at 150° C. for 15 minutes, and the weight thereof was measured. Then, the results were substituted into Equation 2 below to calculate total solids content (TSC). Then, polymerization conversion rate was calculated by substituting the total solids content into Equation 3 below. In Equation 3, the total weight of added monomers is set to 100 parts by weight.

$$\text{Total solids content }(TSC;\%) = \frac{\text{Weight after drying}}{\text{Weight before drying}} \times 100 \quad [\text{Equation 2}]$$

$$\text{Polymerization conversion rate}(\%) = [\text{Total solids content}(TSC) \times (\text{Total weight of added monomers, dionized water, and subsidiary raw materials})/100] - (\text{Weight of added subsidiary raw materials except for monomers and deionized water}) \quad [\text{Equation 3}]$$

In Equation 3, the subsidiary raw materials include an initiator, an emulsifier, an electrolyte, and a molecular weight modifier.

Average particle diameter (nm): Average particle diameter was measured by dynamic light scattering.

Impact strength (kgf·cm/cm): Izod impact strength was measured using a specimen having a thickness of ⅛" according to ASTM D256.

Flow index (g/10 min): Flow index was measured at 220° C. under a load of 10 kg for 10 minutes according to ASTM D1238.

Elongation rate (%): According to ASTM D638, a specimen was pulled at a cross head speed of 200 mm/min using a universal testing machine (Model: 4466, Instron Co.), and then a point at which the specimen was truncated was measured. Then, elongation rate (%) was calculated by substituting the measurement results into Equation 1 below.

$$\text{Elongation rate (\%)} = \text{Length after elongation/initial length} \times 100 \quad [\text{Equation 1}]$$

Gloss: Gloss was measured at an angle of 45° according to ASTM D528.

Colorability (blackness): A color L value was measured using a color meter (model name: Color Eye 7000A) according to a CIE 1976 L*a*b* color space. In this case, L=100 means pure white, and L=0 means pure black. Blackness becomes better as the L value decreases.

Color apparent strength: Color apparent strength was measured using a color meter (Color Eye 7000A, GRETAGMACBETH Co.) and calculated using Equation 4 below. In color expression evaluation, the color apparent strength of a reference specimen is set to 100, and when the color apparent strength of a specimen is greater than 100, the specimen is evaluated as having excellent color expression. In the present invention, the specimen of Comparative Example 1 was used as a reference specimen.

$$\text{Apparent strength} = \frac{\sum_{700}^{400} K/S \text{ Sample}}{\sum_{700}^{400} K/S \text{ Standard}} \times 100 \quad [\text{Equation 4}]$$

TABLE 3

| Classification | | Example 1 | Example 2 | Example 3 | Example 4 |
|---|---|---|---|---|---|
| Graft copolymer | Crosslinking agent | M3130 | M3160 | M3130 | M3160 |
| | Polymerization conversion rate (%) | 99.3 | 98.6 | 99.1 | 98.9 |
| | Average particle diameter of seed (nm) | 234 | 238 | 226 | 225 |
| | Average particle diameter of core (nm) | 474 | 463 | 425 | 461 |
| | Average particle diameter of shell (nm) | 557 | 549 | 512 | 546 |
| Thermoplastic resin composition | Impact strength | 29.0 | 28.0 | 27.5 | 24.7 |
| | Flow index | 13.4 | 13.2 | 13.1 | 13.3 |
| | Elongation rate | 41 | 35 | 38 | 34 |
| | Gloss | 81.2 | 81.3 | 76.2 | 74.6 |
| | Colorability (blackness) | 27.87 | 27.99 | 28.17 | 28.13 |
| | Color apparent strength | 104.93 | 104.42 | 102.58 | 101.36 |

TABLE 4

| Classification | | Comparative Example 1 | Comparative Example 2 | Comparative Example 3 | Reference Example 1 | Reference Example 2 |
|---|---|---|---|---|---|---|
| Graft copolymer | Crosslinking agent | Bifunctionality | M300 | M3190 | M3130 | M3130 |
| | Polymerization conversion rate (%) | 98.8 | 99.0 | 98.6 | 98.7 | 98.7 |
| | Average particle diameter of seed (nm) | 223 | 236 | 241 | 226 | 219 |
| | Average particle diameter of core (nm) | 429 | 448 | 448 | 426 | 429 |
| | Average particle diameter of shell (nm) | 513 | 534 | 530 | 521 | 518 |
| Thermoplastic resin composition | Impact strength | 25.6 | 22.1 | 19.5 | 19.5 | 20.2 |
| | Flow index | 13.6 | 13.7 | 12.9 | 13.8 | 13.2 |
| | Elongation rate | 31 | 30 | 30 | 29 | 28 |
| | Gloss | 72.1 | 69.5 | 79.5 | 70.8 | 71.2 |
| | Colorability (blackness) | 28.44 | 28.28 | 28.00 | 28.55 | 28.42 |
| | Color apparent strength | 100 | 100.18 | 100.90 | 100.52 | 100.27 |

As shown in Tables 3 and 4, it can be confirmed that, compared to Comparative Examples 1 to 3 outside the scope of the present invention, Examples 1 to 4 according to the present invention have excellent gloss, colorability (blackness), and color apparent strength while having mechanical properties, such as impact strength, elongation rate, and flow index, equal or superior to those of Comparative Examples 1 to 3. In particular, considering that Examples 1 to 4 have higher color apparent strength values than Comparative Example 1 that has a color apparent strength of 100, it can be seen that Examples 1 to 4 are excellent in terms of color expression.

In addition, it can be confirmed that, compared to Examples 1 to 4, in the case of Reference Examples 1 and 2 including a multifunctional crosslinking agent in excess or in small amount, gloss, color apparent strength, and colorability (blackness) deteriorate.

The invention claimed is:

1. An alkyl acrylate compound-vinyl cyanide compound-aromatic vinyl compound graft copolymer, comprising:
    a seed prepared by polymerizing one or more compounds selected from the group consisting of an alkyl acrylate compound, an aromatic vinyl compound, and a vinyl cyanide compound and a multifunctional crosslinking agent;
    a core formed to surround the seed and prepared by polymerizing an alkyl acrylate compound and the multifunctional crosslinking agent; and
    a graft shell formed to surround the core and prepared by polymerizing an aromatic vinyl compound and a vinyl cyanide compound,
    wherein the multifunctional crosslinking agent has a weight average molecular weight of 600 to 1,400 g/mol, and
    wherein the multifunctional crosslinking agent has 3 or more functional groups.

2. The alkyl acrylate compound-vinyl cyanide compound-aromatic vinyl compound graft copolymer according to claim 1, wherein the multifunctional crosslinking agent comprises a compound represented by Chemical Formula 1 below:

[Chemical Formula 1]

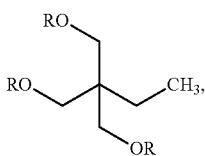

wherein R is

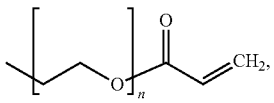

and wherein n is an integer of 3 to 6.

3. The alkyl acrylate compound-vinyl cyanide compound-aromatic vinyl compound graft copolymer according to claim 1, wherein, based on 100 parts by weight of the graft copolymer, the multifunctional crosslinking agent is comprised in the seed in an amount of 0.005 to 0.1 parts by weight.

4. The alkyl acrylate compound-vinyl cyanide compound-aromatic vinyl compound graft copolymer according to claim 1, wherein, based on 100 parts by weight of the graft copolymer, the multifunctional crosslinking agent is comprised in the core in an amount of 0.04 to 0.8 parts by weight.

5. The alkyl acrylate compound-vinyl cyanide compound-aromatic vinyl compound graft copolymer according to claim 1, wherein the graft copolymer comprises 1 to 20% by weight of the seed, 35 to 65% by weight of the core, and 30 to 60% by weight of the graft shell.

6. The alkyl acrylate compound-vinyl cyanide compound-aromatic vinyl compound graft copolymer according to claim 1, wherein the core comprising the seed has an average particle diameter of 300 to 700 nm.

7. A thermoplastic resin composition, comprising;
15 to 65% by weight of the alkyl acrylate compound-vinyl cyanide compound-aromatic vinyl compound graft copolymer according to claim 1;
0 to 30% by weight of an acrylate-aromatic vinyl compound-vinyl cyanide compound graft copolymer containing acrylate rubber as a core having an average particle diameter of 50 to 300 nm; and
30 to 70% by weight of a matrix resin.

8. The thermoplastic resin composition according to claim 7, wherein the matrix resin is a polymer prepared by polymerizing one or more monomers selected from the group consisting of an aromatic vinyl compound, a vinyl cyanide compound, and a (meth)acrylic acid alkyl ester compound.

9. The thermoplastic resin composition according to claim 7, wherein the thermoplastic resin composition has a gloss of 74 or more as measured at an angle of 45° according to ASTM D528.

10. The thermoplastic resin composition according to claim 7, wherein the thermoplastic resin composition has a blackness (color L value) of 28.2 or less as measured using a color meter according to a CIE1976 L*a*b* color space.

11. A molded article manufactured using the thermoplastic resin composition according to claim 7.

12. A method of preparing an alkyl acrylate compound-vinyl cyanide compound-aromatic vinyl compound graft copolymer, the method comprising:
a seed polymerization step of preparing a seed by polymerizing one or more compounds selected from the group consisting of an alkyl acrylate compound, an aromatic vinyl compound, and a vinyl cyanide compound and a multifunctional crosslinking agent;
a core polymerization step of preparing a core by polymerizing an alkyl acrylate compound and the multifunctional crosslinking agent in presence of the seed; and
a graft shell polymerization step of preparing a graft shell by polymerizing an aromatic vinyl compound and a vinyl cyanide compound in presence of the core,
wherein the multifunctional crosslinking agent has a weight average molecular weight of 600 to 1,400 g/mol, and
wherein the multifunctional crosslinking agent has 3 or more functional groups.

* * * * *